United States Patent
Ham et al.

(10) Patent No.: US 7,790,327 B2
(45) Date of Patent: Sep. 7, 2010

(54) REINFORED MATRIX FOR MOLTEN CARBONATE FUEL CELL AND METHOD FOR PREPARING THE SAME

(75) Inventors: Hyung C. Ham, Seoul (KR); Seong A. Hong, Seoul (KR); In-Hwan Oh, Seoul (KR); Tae-Hoon Lim, Seoul (KR); Suk-Woo Nam, Seoul (KR); Sung P. Yoon, Gyeonggi-do (KR); Jonghee Han, Seoul (KR); Jaeyoung Lee, Incheon (KR); Hyoung-Juhn Kim, Gyeonggi-do (KR); Eun A. Cho, Seoul (KR); Kwang S. Lee, Gyeonggi-do (KR); Heung Y. Ha, Seoul (KR); Sang Y. Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 639 days.

(21) Appl. No.: 11/604,747

(22) Filed: Nov. 28, 2006

(65) Prior Publication Data

US 2008/0113258 A1    May 15, 2008

(30) Foreign Application Priority Data

Nov. 14, 2006    (KR) .................... 10-2006-0112314

(51) Int. Cl.
*H01M 8/14* (2006.01)
*H01M 8/02* (2006.01)

(52) U.S. Cl. .................... 429/475; 429/535; 429/477

(58) Field of Classification Search ............... 429/41, 429/44, 46, 35, 184, 33; 427/115
See application file for complete search history.

(56) References Cited

U.S. PATENT DOCUMENTS

| 4,526,845 A | * | 7/1985 | Reiser et al. ................. 429/41 |
| 5,478,663 A | | 12/1995 | Cipollini et al. |
| 2004/0062981 A1 | * | 4/2004 | Friedrich ................. 429/46 |

FOREIGN PATENT DOCUMENTS

| JP | 61-131371 | 6/1986 |
| JP | 61131371 A | * 6/1986 |

OTHER PUBLICATIONS

Patent Abstracts of Japan, JP 61131371, Ozu et al., Jun. 1986.*
Chryssikos et al., "Vibrational investigation of lithium metaborate-metaaluminate glasses and crystals", Journal of Non-Crystalline Solids 217 (1997) 278-290.*
Nufer, "Ceramic greensheet technology for glass-ceramic/copper multilevel substrates", IBM Technology Products bulletin, 1992.*

* cited by examiner

*Primary Examiner*—Jonathan Crepeau
*Assistant Examiner*—Kenneth Douyette
(74) *Attorney, Agent, or Firm*—Dickstein Shapiro LLP

(57) ABSTRACT

Provided is a reinforced matrix for molten carbonate fuel cell, wherein a mechanical strength of the matrix is increased by adding a reinforcing agent having a low melting point.

11 Claims, 7 Drawing Sheets

REINFORCED MATRIX FOR MOLTEN CARBONATE FUEL CELL AND METHOD FOR PREPARING THE SAME

BACKGROUND OF THE INVENTION

1. Field of the Invention

The present invention relates to a reinforced matrix for a molten carbonate fuel cell and a method for preparing the same.

2. Description of the Prior Art

A molten carbonate fuel cell (MCFC) comprises a cathode in which carbonate ions are generated from the reaction of oxygen, carbon dioxide and electrons, an electrolyte which enables the carbonate ions to easily move, a matrix and an anode in which hydrogen is oxidized to generate electrons and reacts with the carbonate ions to form water.

The matrix supports a fluent liquid phase electrolyte at high temperature, thereby fixing it therein. In order to support the liquid electrolyte in a good manner, the matrix is needed to have a fine porous structure.

A size of the pore and a porosity typically required for the matrix is 0.1~0.5 μm and 40~70%, respectively <Handbook of Fuel Cells. Volume 4 (2003), pp. 357-356>. Ceramic materials of α, β or γ-type $LiAlO_2$ (lithium aluminate) etc. are used for the matrix.

In order to form a suitable fine structure, a particle size of the ceramic material is required to be 1 μm or less and a surface area thereof is required to be 10 $m^2/g$.

However, when the matrix for MCFC consists of the fine particles having such large surface area, the strength thereof becomes considerably lowered, so that the matrix is easily collapsed.

In order to solve the problem, macro particles having an average size of 50 μm or alumina fibers have been added to reinforce the matrix in the art.

In the art, however, the strength is not sufficiently increased even in case of adding the macro particles. Further, the alumina fiber is expensive and becomes unstable at environments where the MCFC operates <C. Y Yuh, C. M. Huang and M. Fraoogue, Advanced in carbonate fuel cell matrix and electrolyte. Proceedings of the Fourth International Symposium on Carbonate Fuel Cell Technology, Electrochemical Society Pennington, N.J. (1997), pp. 6678>.

Meanwhile, recently, aluminum has been added to the conventional matrix to make a reinforced matrix <C. M. Huang and C. Y Yuh, U.S. Pat. No. 5,869,203, Feb. 9, 1999>.

According to the method, the aluminum reacts with the electrolyte to form $LiAlO_2$, which results in a loss of the electrolyte. In addition, it is very difficult to control the fine structure of the matrix for MCFC according to the method. Furthermore, since the strength is increased after the aluminum reacts with the electrolyte, there is a drawback that the matrix is easily broken before the aluminum reacts with the electrolyte.

A matrix that consists of titanium carbide, zirconium carbide, aluminum oxide, $Li_2CO_3$ and the like and reacts with the oxygen during the operation to form $Li_2TiO_3$, $LiAlO_2$ and $Li_2ZrO_3$ is known <U.S. Patent Publication No. 2004/0062981>. However, the strength of the matrix is not increased.

SUMMARY OF THE INVENTION

Accordingly, the present invention has been made to solve the above problems occurring in the prior art.

An object of the invention is to provide a reinforced matrix for a molten carbonate fuel cell (MCFC) and a method for preparing the same, wherein the strength of the matrix is able to be highly increased at a low temperature, in particular at a temperature of melting point or less of an electrolyte, and to this end, the collapse of the matrix is able to be prevented during a pretreatment of the MCFC, and a commercialization of the MCFC is possible sine the reinforcing agent is less expensive than the conventional reinforcing agent such as alumina fiber.

In order to accomplish the above object, there is provided a reinforced matrix for molten carbonate fuel cell being made of a sintered body of a mixture comprising $LiAlO_2$ which is matrix powder particles and $B_2O_3$ which is a reinforcing agent.

According to an embodiment of the invention, the sintered body comprises a $Li_2AlBO_4$ phase resulting from a reaction of the $B_2O_3$ and $LiAlO_2$.

According to an embodiment of the invention, crystalline form of the $LiAlO_2$ is α, γ or β type.

According to an embodiment of the invention, a particle size of the $LiAlO_2$ powder is 1 μm or less.

According to an embodiment of the invention, the mixture further comprises $LiAlO_2$ having a particle size of 10 μm or more.

According to an embodiment of the invention, a content of the B2O3 is 0.5~15 wt % for the $LiAlO_2$ and $B_2O_3$ of 100 weight percent.

According to an embodiment of the invention, a binder of 10 to 40 weight part, a plasticizer of 10 to 40 weight part, an antifoaming agent of 1 to 5 weight part, a dispersing agent of 1 to 2 weight part and a solvent of 140 to 350 weight part is further contained for the $LiAlO_2$ and $B_2O_3$ of 100 weight part.

In order to accomplish the above object, there is provided a method for preparing a reinforced matrix for molten carbonate fuel cell, the method comprising a step of mixing $B_2O_3$, which is a reinforcing agent, with $LiAlO_2$, which is matrix powder particles, and sintering the mixture.

According to an embodiment of the invention, the mixture is ball-milled.

According to an embodiment of the invention, the method comprises steps of: first ball-milling a slurry made by mixing the $LiAlO_2$ powders with a dispersing agent, a solvent, a binder, a plasticizer and an antifoaming agent, and then adding the $B_2O_3$ to the first ball-milled slurry, and second ball-milling the mixture to prepare a final slurry, or first ball-milling a slurry made by mixing the $LiAlO_2$ powders with a solvent and the $B_2O_3$, and then adding a dispersing agent, an antifoaming agent, a binder and a plasticizer to the first ball-milled slurry, and second ball-milling the mixture to prepare a final slurry (S1); degassing the final slurry (S2); and molding the degassed slurry into a shaped body, for example forming a green sheet by means of a tape casting method, and sintering the molded body (S3).

According to an embodiment of the invention, the sintering is carried out in-situ during a pretreatment process of the molten carbonate fuel cell.

DETAILED DESCRIPTION OF THE INVENTION

Hereinafter, the invention will be described in detail with reference to the accompanying drawings.

According to the invention, $B_2O_3$ having a low melting point is added as a reinforcing agent to $LiAlO_2$, which is matrix particles, to form a sintered structure of the $LiAlO_2$. The structure serves as a frame structure of the matrix and makes the strength of the matrix increased.

Figure 1:
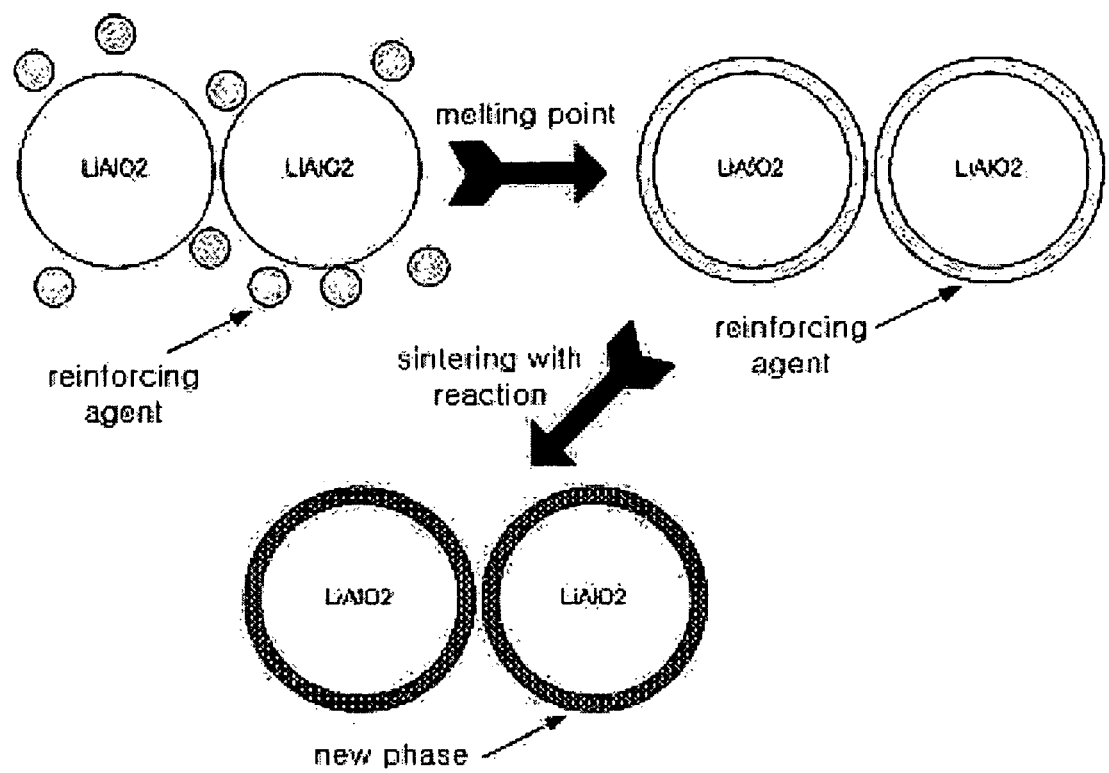
FIG. 1 shows a reinforcing principle of a reinforced matrix of a molten carbonate fuel cell according to the invention.

FIG. 1 shows a reinforcing principle of a reinforced matrix of a molten carbonate fuel cell according to the invention.

As shown in FIG. 1, a reinforced matrix is prepared by adding the reinforcing agent of $B_2O_3$ having a low melting point of 450° C. to $LiAlO_2$, which is matrix particles, and sintering the mixture. Specifically, $B_2O_3$ becomes a liquid phase at temperature higher than its melting point and the prepared liquid phase $B_2O_3$ is able to be uniformly distributed to the $LiAlO_2$ that is matrix particles. In addition, the $B_2O_3$ reacts with the $LiAlO_2$ particles to form a new phase of $Li_2AlBO_4$ at surfaces of the respective particles. The new phase promotes the sintering between the $LiAlO_2$ particles, thereby increasing the strength of the matrix. In addition, since the $Li_2AlBO_4$ phase is stable at a MCFC operation temperature and environments of the electrolytes, it enables the MCFC to work for a long time.

For the distribution of the reinforcing agent, $B_2O_3$, it is preferable to carry out a ball-milling process. For example, first ball-milled is a slurry, which is made by mixing the $LiAlO_2$ powders with a dispersing agent, a solvent, a plasticizer, an antifoaming agent and a binder, and the $B_2O_3$ is added to the first ball-milled slurry. Then, the prepared mixture is further second ball-milled in order to obtain a final slurry. Alternatively, first ball-milled is a slurry, which is made by adding a solvent and the $B_2O_3$ to the $LiAlO_2$ powders. Then, a dispersing agent, a plasticizer, an antifoaming agent and a binder are mixed with the first ball-milled slurry and the mixture is further second ball-milled in order to obtain a final slurry.

Meanwhile, α, γ or β type is able to be used for a crystalline form of the $LiAlO_2$.

A particle size of the $LiAlO_2$ powder is preferably 1 μm or less. When the particle size of the $LiAlO_2$ powder is larger than 1 μm, a size of the pore becomes large. To this end, electrolyte-supporting ability tends to become lowered and crossover rates of gases in cathode and anode tend to become higher, so that the matrix tends to be broken and a performance of the electrode tends to be decreased.

Preferably, the mixture further comprises $LiAlO_2$ having a particle size of 10 μm or more. That is, in case that the MCFC matrix consists of only the $LiAlO_2$ powders having a particle size of 1 μm or less, the matrix tends to be fragile. Accordingly, when the mechanical and heat stresses are applied to the matrix, the matrix tends to be easily broken. However, in case that $LiAlO_2$ having a particle size of 10 μm or more is further used, the relatively macro particle of $LiAlO_2$ serves as a crack arrestor to prevent the matrix from being easily broken.

Furthermore, a content of the B2O3 is preferably 0.5~15 wt % for the $LiAlO_2$ and $B_2O_3$ of 100 weight percent in terms of the increase of the strength.

As the solvent, a mixture of toluene and alcohol such as ethanol is used. In addition to the solvent, an organic material such as dispersing agent, antifoaming agent, binder, plasticizer and the like is added to obtain the slurry.

As the dispersing agent, antifoaming agent, binder and plasticizer, general ones typically used for a tape casting process are used.

For example, fish oil, corn and the like are used as the dispersing agent and isopropyl alcohol and 2-propanol are used as the antifoaming agent. Dibutylphthalate is used as the plasticizer and polyvinyl butyral (PVB) is used as the binder.

The slurry preferably comprises the binder of 10 to 40 weight parts, the plasticizer of 10 to 40 weight parts, the antifoaming agent of 1 to 5 weight parts, the dispersing agent of 1 to 2 weight parts and the solvent of 140 to 350 weight parts, based on $LiAlO_2$ and $B_2O_3$ of 100 weight parts.

After removing the air bubbles contained in the ball-milled final slurry, a green sheet is prepared using a tape casting method. The sintering of the green sheet is preferably carried out in-situ during the pretreatment of the MCFC.

EXAMPLE $B_2O_3$ 10 g, γ-$LiAlO_2$ powder 190 g and solvent (mixture of toluene and ethanol) 360 g were prepared and then first ball-milled for 24 hours. Then, the dispersing agent (Diperbyk110) 2 g, the antifoaming agent (DAPPO-348; San Nopco Korea) 2 g, the binder (polyvinyl butyral; B76) 40 g and the plasticizer (dibutylphthalate; DBP) 36.7 g were added and then second ball-milled for 48 hours.

The second ball-milled slurry was degassed and then subject to the tape casting to prepare a ceramic green sheet for a molten carbonate fuel cell containing γ-$LiAlO_2$ and $B_2O_3$, which is as reinforcing agent. Then, the green sheet was sintered at 650° C. for 2 hours to prepare a matrix.

A content of $B_2O_3$ was 5 wt % for the γ-$LiAlO_2$ and $B_2O_3$ of 100 weight.

COMPARATIVE EXAMPLE

Except that $B_2O_3$ was not added, a matrix was prepared in the same manner as the above example.

EXPERIMENT

Figure 2:
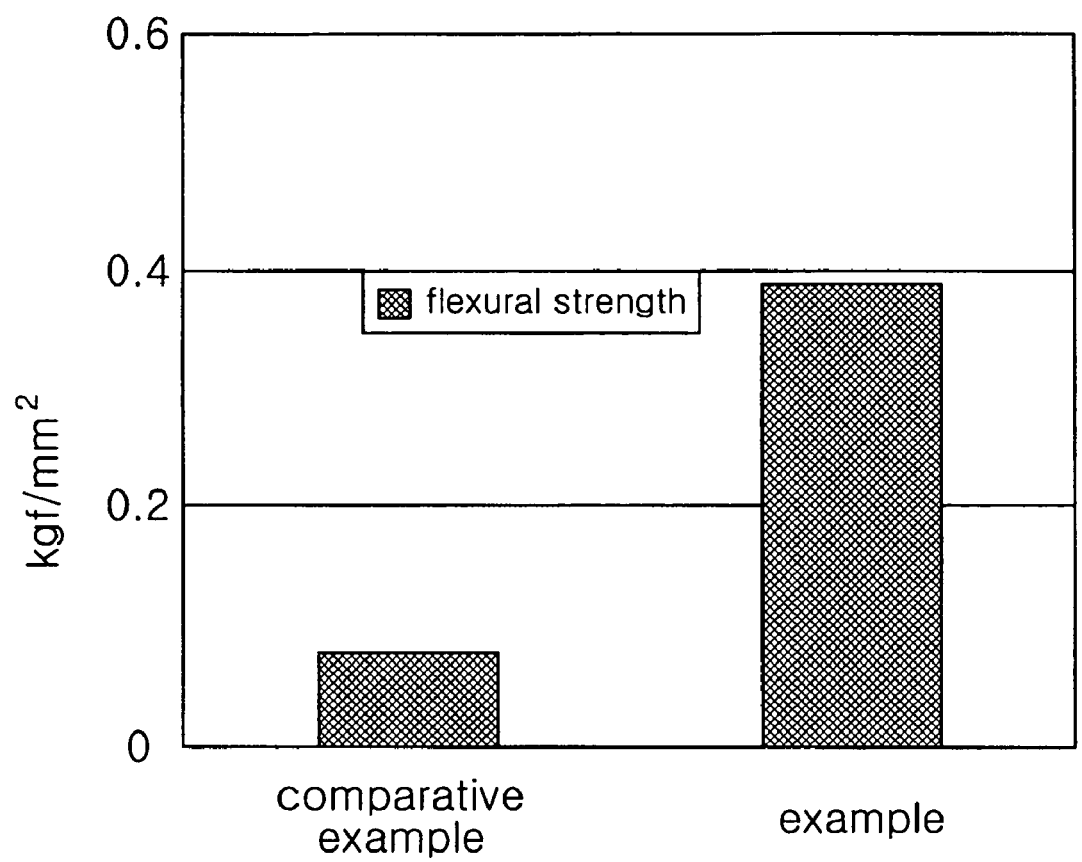
FIG. 2 is a graph showing flexural strengths of matrices of an example and a comparative example in the invention.

The flexural strengths of the matrices of the example and the comparative example were respectively measured. FIG. 2 is a graph showing flexural strengths of matrices of an example and a comparative example in the invention. Table 1 shows three-points bending strength of the matrices of the example and the comparative example.

TABLE 1

|  | three-points bending strength (Kg/mm²) |
| --- | --- |
| Matrix of the example | 0.388 |
| Matrix of the comparative example | 0.078 |

As can be seen from FIG. 2 and Table 1, the strength of the matrix of the example containing the reinforcing agent was more increased than that of the matrix of the comparative example without the reinforcing agent.

Figure 3:
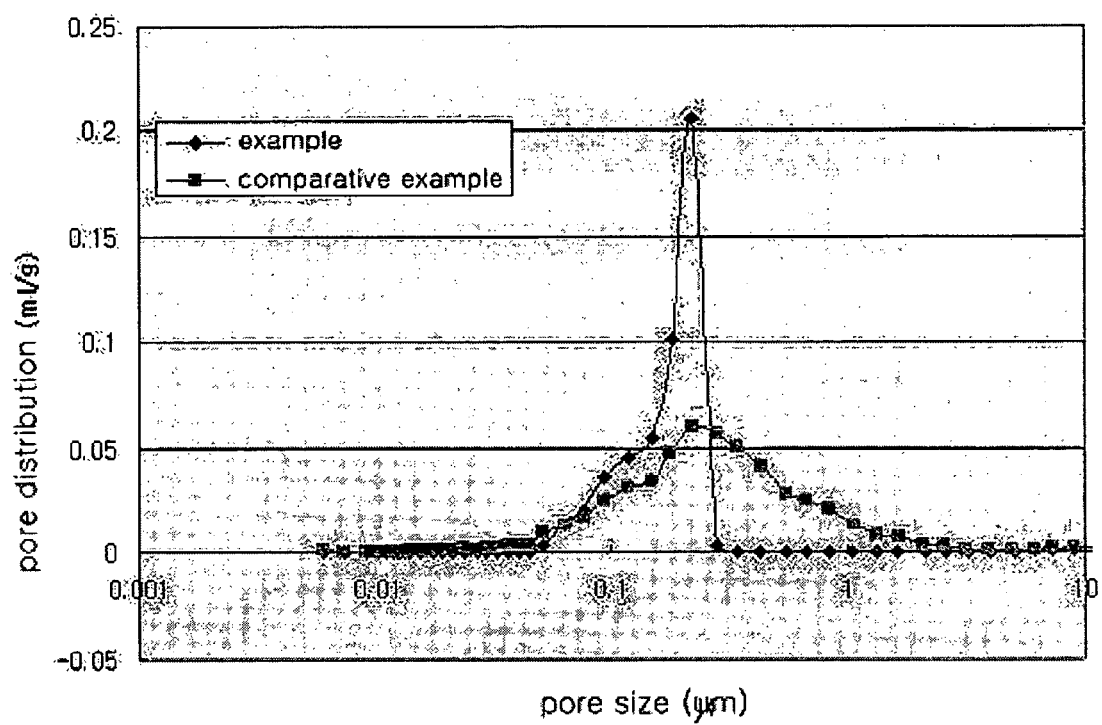
FIG. 3 is a graph showing pore distributions of matrices of an example and a comparative example in the invention.

FIG. 3 is a graph showing pore distributions of matrices of an example and a comparative example in the invention.

Table 2 shows average pore sizes and porosities measured with a mercury intrusion method.

TABLE 2

|  | Average pore size (μm) | Porosity (%) |
|---|---|---|
| Example | 0.24 | 59 |
| comparative example | 0.28 | 66 |

As can be seen from FIG. 3 and Table 2, the matrix of the example has the pore size of 0.2 μm and the porosity of 59%, which means that it is suitable for a matrix for a molten carbonate fuel cell.

Figure 4:
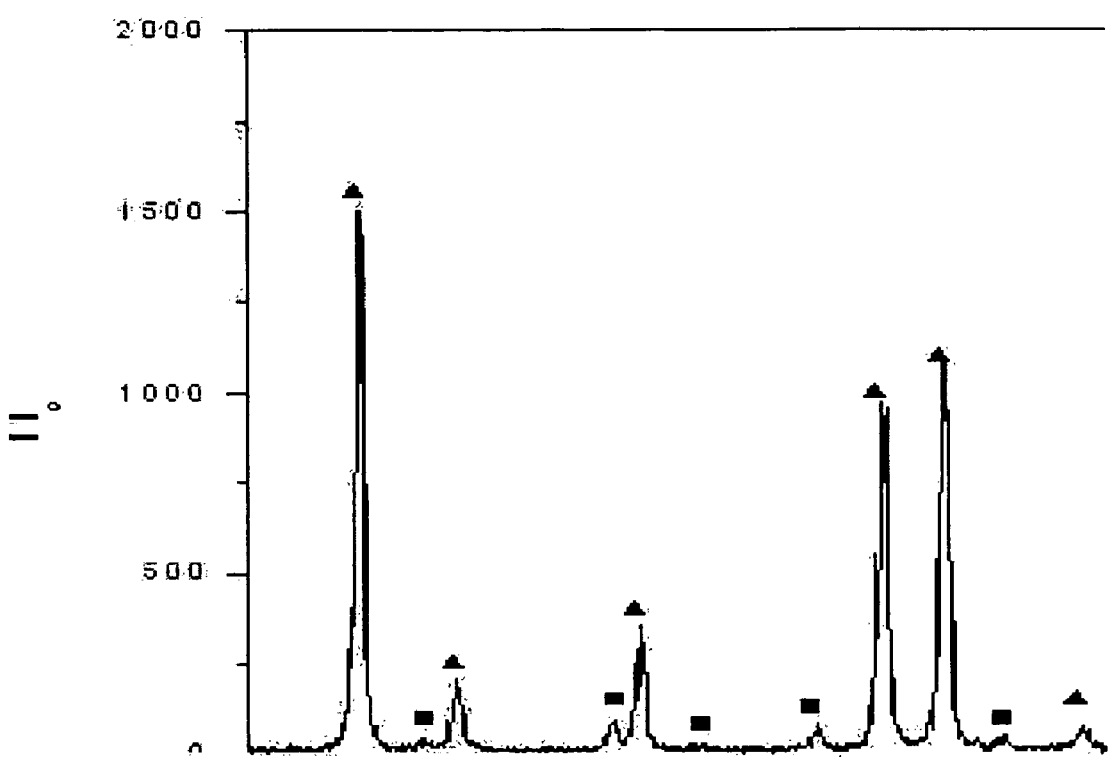
FIG. 4 is a graph showing a XRD of a matrix of an example in the invention.

Meanwhile, FIG. 4 is a graph showing a XRD of a matrix of an example in the invention.

As shown in FIG. 4, a new phase $Li_2AlBO_4$ was formed. This shows that the strength of the matrix was increased due to the sintering with the reaction of $B_2O_3$ and $LiAlO_2$.

Figure 5:
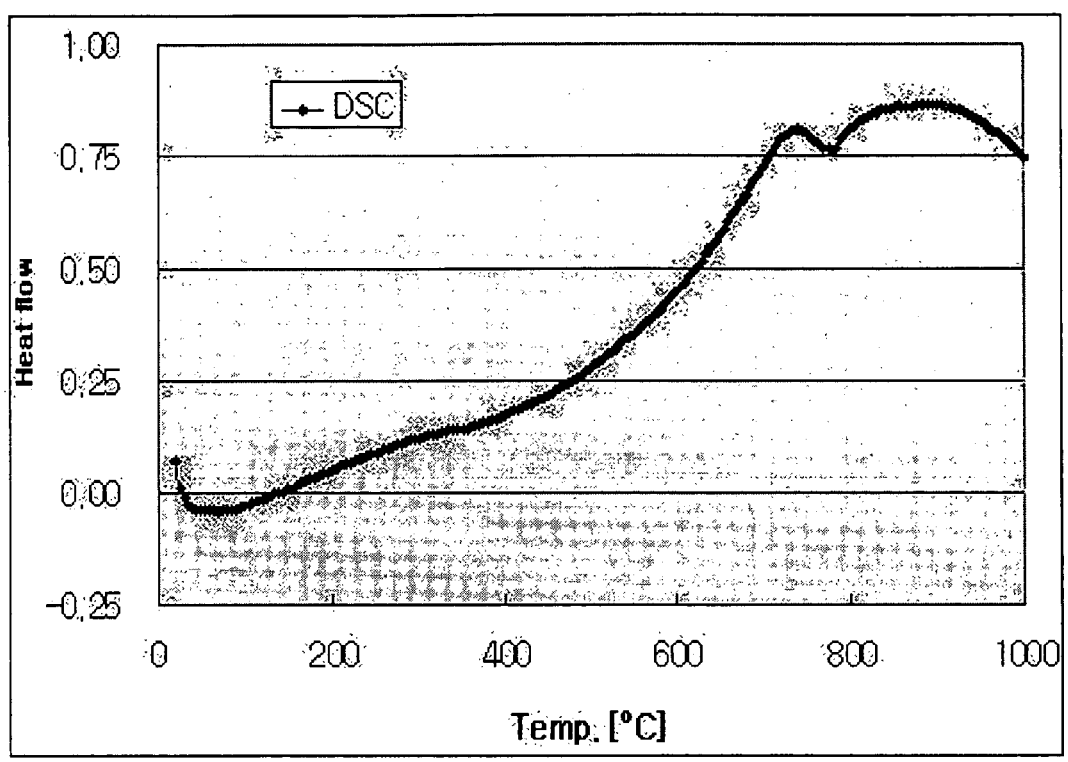
FIG. 5 is a graph showing a high temperature DSC of a matrix of an example in the invention.

FIG. 5 is a graph showing a high temperature DSC of a matrix of an example in the invention.

As can be seen from FIG. 5, an endothermic peak was observed near about 700~800° C. This peak indicates the $Li_2AlBO_4$ phase. This means that the new phase is stable even at the operating temperatures of the MCFC.

Figure 6:
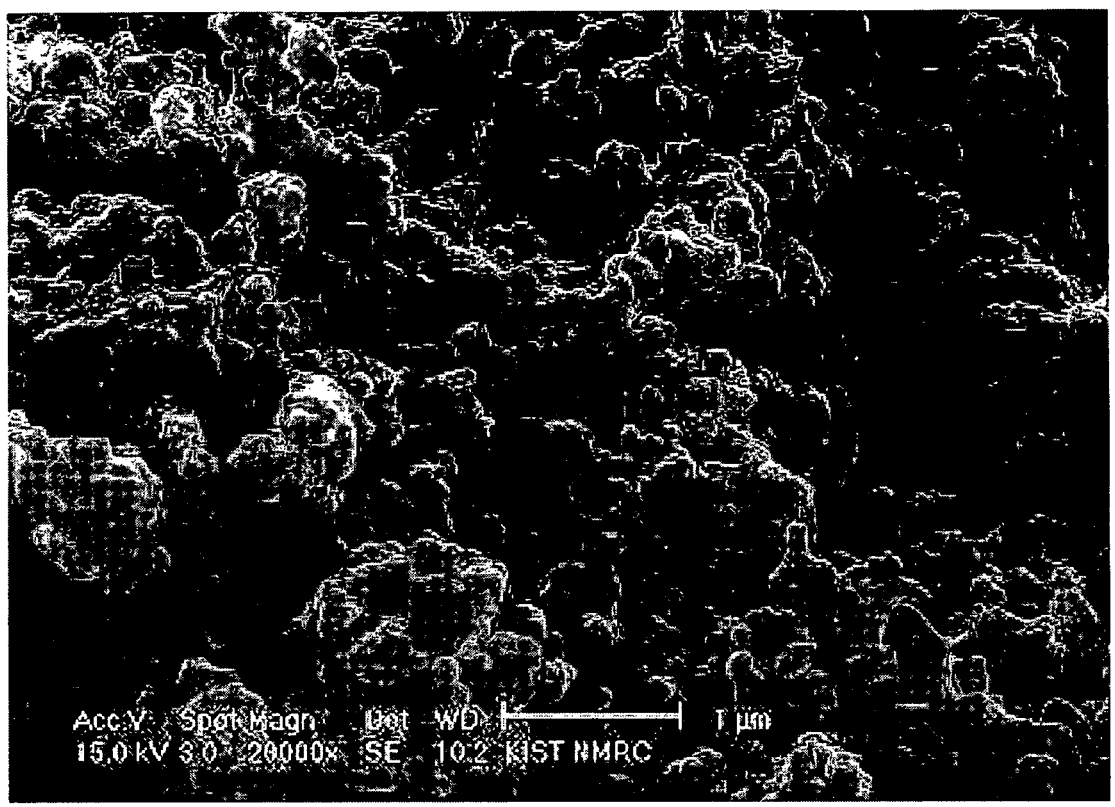
FIG. 6 is a SEM photograph of a matrix of an example in the invention.
Figure 7:
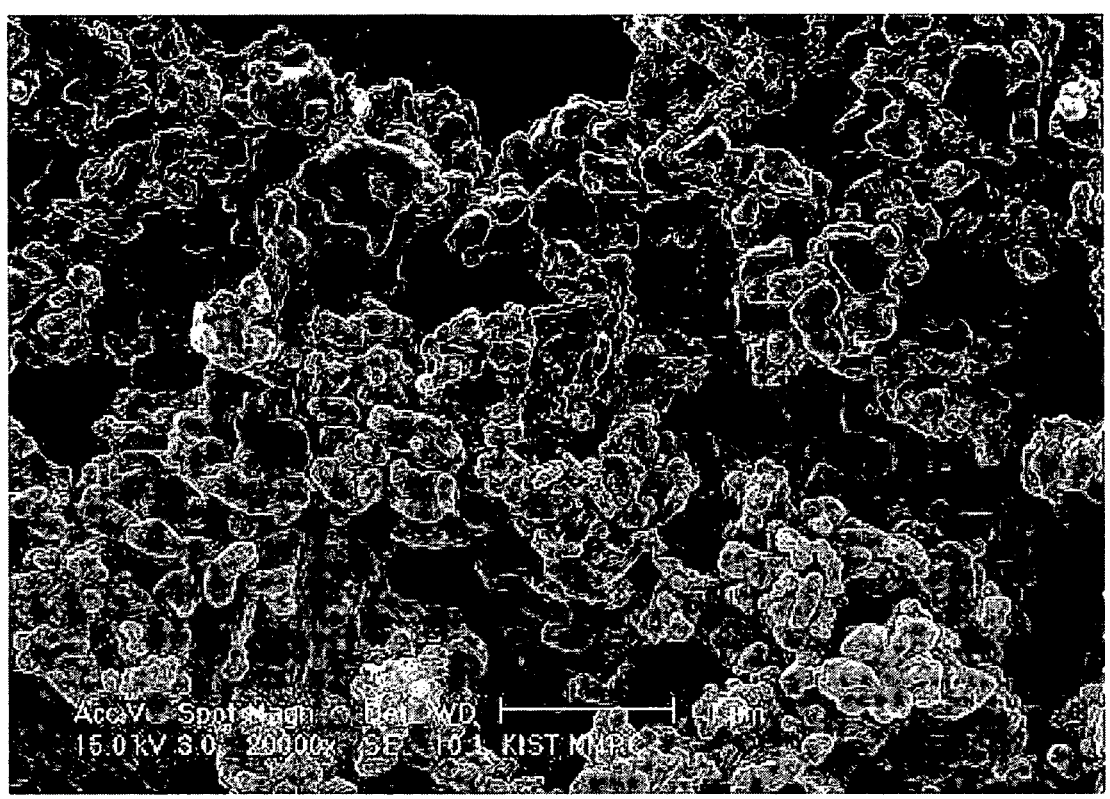
FIG. 7 is a SEM photograph of a matrix of a comparative example in the invention.

FIG. 6 is a SEM photograph of a matrix of an example in the invention. FIG. 7 is a SEM photograph of a matrix of a comparative example in the invention.

As can be seen from FIGS. 6 and 7, the SEM photograph of the matrix of the example shows that a frame structure was formed therein. To the contrary, in case of the matrix of the comparative example, a frame structure was not formed.

As described above, according to the invention, the reinforcing agent having a low melting point is added to a matrix for a molten carbonate fuel cell, which makes it possible to increase the mechanical strength of the matrix even at a low temperature. In addition, since the strength of the matrix can be increased before the melting of the electrolyte, it is possible to improve the resistance to the mechanical stress due to the non-uniformity of the surface pressure, which is caused during the pretreatment of the molten carbonate fuel cell. This considerably contributes to improvement of durability of the molten carbonate fuel cell. Further, since the reinforcing agent used for the invention is less expensive than the conventional reinforcing agent and can be easily applied to the preparation of the matrix, it is expected that the invention will highly contribute to the commercialization of the molten carbonate fuel cell.

What is claimed is:

1. A reinforced matrix supporting liquid electrolyte for a molten carbonate fuel cell which is located between an anode and a cathode, the reinforced matrix being made of a sintered body comprising:
   (a) $LiAlO_2$ matrix particles having a particle size of 1 μm or less and $LiAlO_2$ matrix particles having a particle size of 10 μm or more; and
   (b) $Li_2AlBO_4$ phase at surfaces of $LiAlO_2$ matrix particles, wherein the $Li_2AlBO_4$ phase is resulting from reaction of liquid phase $B_2O_3$ with the $LiAlO_2$ matrix particles, wherein the liquid phase $B_2O_3$ is uniformly distributed on the surface of the $LiAlO_2$ matrix particles.

2. The reinforced matrix according to claim 1, wherein crystalline form of the $LiAlO_2$ is α, γ or β type.

3. The reinforced matrix according to claim 1, wherein a content of the $B_2O_3$ is 0.5~15 wt % for $LiAlO_2$ and $B_2O_3$ of 100 weight percent.

4. The reinforced matrix according to claim 1, wherein a binder of 10 to 40 weight part, a plasticizer of 10 to 40 weight part, an antifoaming agent of 1 to 5 weight part, a dispersing agent of 1 to 2 weight part and a solvent of 140 to 350 weight part is further contained for $LiAlO_2$ and $B_2O_3$ of 100 weight part.

5. A method for preparing a reinforced matrix supporting liquid electrolyte for a molten carbonate fuel cell which is located between a cathode and an anode, comprising a step of mixing $B_2O_3$, which is a reinforcing agent, with $LiAlO_2$, which is matrix powder particles, and sintering the mixture to make a sintered body, wherein the sintered body comprises:
   (a) $LiAlO_2$ matrix particles having a particle size of 1 μm or less and $LiAlO_2$ matrix particles having a particle size of 10 μm or more; and
   (b) $Li_2AlBO_4$ phase at surfaces of $LiAlO_2$ matrix particles, wherein $Li_2AlBO_4$ phase is resulting from the reaction of liquid phase $B_2O_3$ with the $LiAlO_2$ matrix particles, wherein the liquid phase $B_2O_3$ is uniformly distributed on the surface of the $LiAlO_2$ matrix particles.

6. The method according to claim 5, wherein the mixture is ball-milled.

7. The method according to claim 5, wherein the method comprises steps of:
   first ball-milling a slurry made by mixing the $LiAlO_2$ powders with a dispersing agent, a solvent, a binder, a plasticizer and an antifoaming agent, then adding the $B_2O_3$ to the first ball-milled slurry, and second ball-milling the mixture to prepare a final slurry (S1);
   degassing the final slurry (S2); and
   molding the degassed slurry into a shaped body and sintering the molded body (S3).

8. The method according to claim 5, wherein the method comprises steps of:
   first ball-milling a slurry made by mixing the $LiAlO_2$ powders with a solvent and the $B_2O_3$, then adding a dispersing agent, an antifoaming agent, a binder and a plasticizer to the first ball-milled slurry, and second ball-milling the mixture to prepare a final slurry (S1);
   degassing the final slurry (S2); and
   molding the degassed slurry into a shaped body and sintering the molded body (S3).

9. The method according to claim 7, wherein, in the step of S3, the slurry is molded by means of a tape casting method to form a green sheet.

10. The method according to claim 5, the sintering is carried out in-situ during a pretreatment process of the molten carbonate fuel cell.

11. The method according to claim 8, wherein, in the step of S3, the slurry is molded by means of a tape casting method to form a green sheet.

* * * * *